Figure 1:
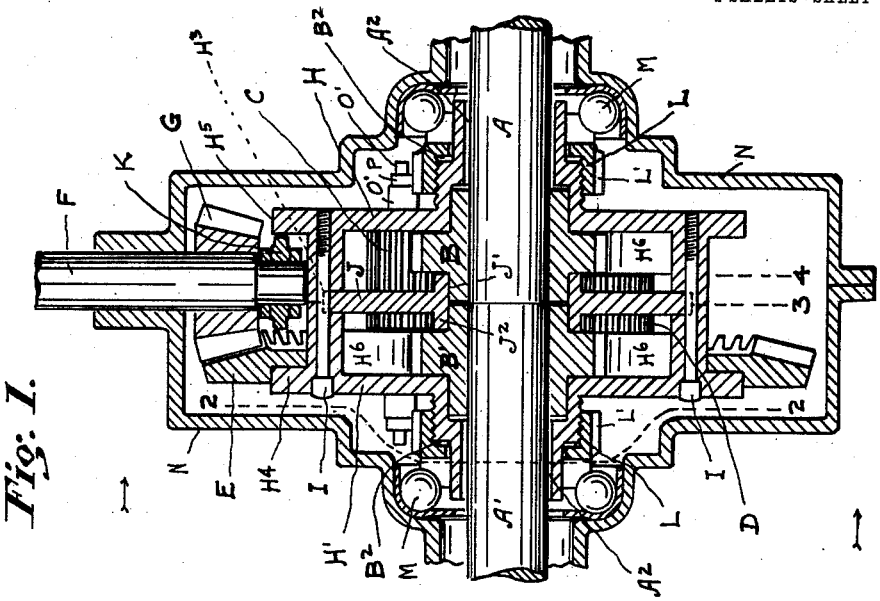

H. L. WARNER.
DIFFERENTIAL GEARING.
APPLICATION FILED SEPT. 25, 1909.

1,018,535.

Patented Feb. 27, 1912.
2 SHEETS—SHEET 1.

WITNESSES:
Ethel L. Lester
John W. Ryan

INVENTOR
HUGH L. WARNER
BY
Thomas R. Ryan
ATTORNEY

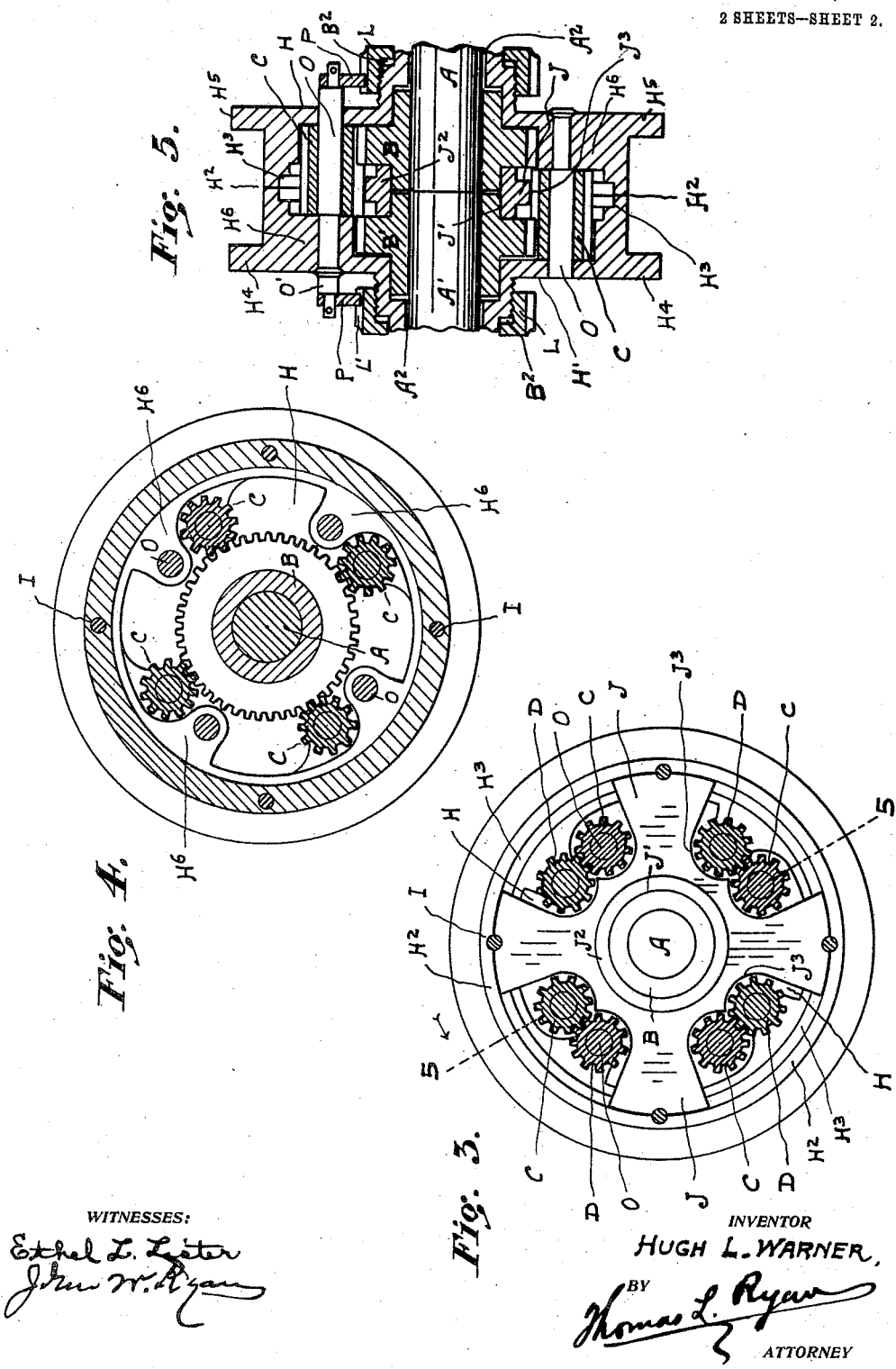

UNITED STATES PATENT OFFICE.

HUGH L. WARNER, OF MUNCIE, INDIANA.

DIFFERENTIAL GEARING.

1,018,535.

Specification of Letters Patent.   Patented Feb. 27, 1912.

Application filed September 25, 1909.   Serial No. 519,506.

*To all whom it may concern:*

Be it known that I, HUGH L. WARNER, a citizen of the United States, and residing at the city of Muncie, in the county of Delaware and State of Indiana, have invented new and useful Improvements in Differential Gearing, and of which invention the following is a specification.

This invention relates to differential or compensating gearing of that type wherein the ends of the alined shafts, are provided with spur gear wheels, and sets of pinions which mesh with each other and which with the spur gear wheels are carried in a housing or hollow drum-shaped frame which is rotated about the axial center of the said shafts, and by which rotating frame the shafts are driven. In this class of gearing, the strains imposed, have strong tendency to deflect the shafts out of true alinement, and also to displace same in directions both longitudinally and transversely the result being unequal wear of the bearings and of the teeth of the gear wheels and pinions, and ultimately in noisy operation and disability.

The objects of the present invention are to improve the construction of such gearing and to that end to provide a gearing and a housing and retaining structure therefor of such form, arrangement and function, that the gearing will withstand the heaviest strains without becoming in the least deranged, and which will be compact, of few parts, economical of manufacture and which will be strong and durable.

These and other more specific objects, as will presently appear, are accomplished by the improved construction, combination and arrangement of parts constituting my invention, and which are described in the specification, defined in the appended claims, and illustrated in the accompanying drawings.

Corresponding parts are designated by similar characters of reference throughout the several views in the drawings, in which—

Figure 2:
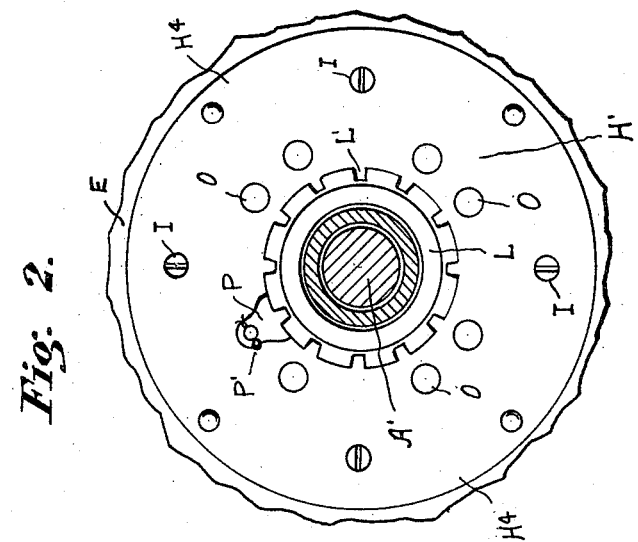

Figure 1 is a central sectional view of my improved gearing mounted upon ball bearings carried by the preferable form of casement or frame shown, and adapted to be driven through bevel gear connections with the driving shaft. Fig. 2, Fig. 3, and Fig. 4, are central sectional views taken on the line 2—2, 3, and 4 respectively in Fig. 1 and as seen in the direction indicated by the arrows. Fig. 5 is a central sectional view taken on the line 5—5 Fig. 3 and as seen in the direction indicated by the arrow.

My improved differential gearing comprises the usual shafts in alinement, which for the purposes of this description, are designated as the shafts A $A^1$. These shafts A $A^1$ have the gear wheels B $B^1$, secured thereto, and the ends of said shafts and the hubs of the said gear wheels will register with each other. Carried by the said shafts and adapted to inclose and support the sets of pinions C and D, is the housing which will be rotated by driving power suitably applied at its peripheral portion. In this description of my invention wherein it is shown in the form or embodiment desirable for use in motor car or automobile construction, I have shown the said housing equipped with the bevel gear wheel E which is secured to the peripheral flange of said housing. The driving shaft F has secured thereto the bevel pinion G which meshes with the gear wheel E.

It will be readily seen that when the housing is moved, both of the shafts, A $A^1$, by virtue of their engagement with said housing, through the gear wheels B $B^1$ and the pinions C and D, will be rotated at the same speed. By the operation of the pinions which perform the usual function, and which have the well known arrangement in combination with the gear wheels and the housing, is accomplished the differential movement of the shafts A $A^1$. The general principle upon which differential gearing of this type is designed and operated is sufficiently well known, that with the construction as clearly shown in the drawings, further description herein of its construction and operation is deemed unnecessary.

In differential gearing of the character described it is essential, in order that positive and reliable performance of the device may be assured and unequal wear of the parts prevented, that the ends of the shafts A $A^1$, and the gear wheels B $B^1$ and the pinions C and D shall be retained in correct position at all times so that they will not be dislodged or strained even slightly out of alinement.

The foregoing desirable results are obtained by the improved and superior combination, arrangement and structure of the parts now to be specifically described.

As plainly shown in Fig. 1 my improved housing is composed of the complemental half sections H and H¹. The hubs of these half sections are of proper internal bore to allow suitable clearance A² between same and the shafts A A¹, and are so counterbored that they will be journaled on the outer portions of the hubs of the gear wheels B B¹. The depth of these counterbores with reference to the length of the outer portions of the hubs of the gear wheels B B¹ is such that there is provided the clearance B². The said half-sections are connected and their meeting faces H² will be joined together snugly by the bolts I. The annular offsets or rabbets H³ form a space in which the peripheral portions of the spider J will be retained. This spider is made preferably of steel and is of proper hardness and its bore constitutes a journal bearing for the inner portions of the hubs of the gear wheels B B¹. The location of the holes for the bolts I, with reference to the seat of the rabbet H³, is such that the bolts will engage recesses provided in the peripheral face of the spider and the latter will be held against rotary displacement. Thus the bolts I perform the double function of holding the half sections H and H¹ securely together and of holding the spider securely in position.

The inner and outer sides of the gear wheels B B¹ will have bearing against the sides of the hub J² of the spider and against the inner faces of the housing walls, respectively. To minimize the friction between the hubs of the gear wheels B B¹ and the counterbores of the housing, is the object of the clearances B² between the ends of the outer portions of said hubs and the seats of said counterbores.

It is essential that the shafts O which carry the pinions C and D, shall be anchored firmly so that there will be no yielding or springing of same. To accomplish this the thickened portions H⁶ of the half sections H and H¹ are provided.

O and O designate the shafts upon which the pinions are carried. These shafts are rigidly secured in said thickened portions in the manner as shown in Fig. 5. Thus supported, a bearing for the pinions C and D of such solidity and strength is provided that a correct meshing of the pinions and the gear wheels B and B¹ will be assured, and "button holing" of the shaft where it passes through the wall of the housing will be avoided. These thickened portions being alternated in their positions and the same and the walls of the housing being so formed as to engage the ends of the pinions and the sides of the gear wheels B and B¹, the parts are all so mutually counterbraced that the most severe strains will not dislodge or spring any of the parts out of correct position. While in this illustration of the invention four sets of pinions are shown, it is obvious that by modifying the form of the spider a different number of sets of pinions may be used.

Advantages of my invention are that the housing members and the spider, constructed and combined as shown, will hold all of the parts solidly in correct alinement; freedom of motion of the operating parts is always assured and unequal strain and wear of the parts is prevented. Coupled with the foregoing advantages are the improvements in construction and in the detailing of the several elements and their connections.

The universal form of means for driving this character of differential gearing, being that of a bevel pinion G carried by a driving shaft F and which is adapted to mesh with a bevel gear wheel or ring secured to the housing; the preferable form of external structure of the half sections which constitute my improved housing, is as shown in Fig. 1. On the peripheral flange H⁴ is secured the bevel gear wheel or ring E; the internal face of the opposite flange H⁵ is machined. Journaled on the end of the driving shaft F and below the bevel pinion G is a roller K having its face to register with the inner face of the flange H⁵.

By the internally threaded adjustment collars L which are screwed on the central lateral extensions or hubs of the housing, the ball bearings M which are carried by a suitable casement or frame N may be at all times kept in perfect adjustment, and at the same time, the position of the housing longitudinally of the shafts A A¹ may be so adjusted that correct meshing of the bevel gear wheel E with the bevel pinion G may be always assured. When the parts are working normally, the roller K will perform no function, but in case some outside strain might be imposed tending to strain the shaft F slightly out of alinement, the roller K then forms a bearing, the correct meshing of the bevel gear will be preserved and derangement or unequal wear thereof will be prevented. In the shouldered ends O¹ of the shafts O are the lock members P, retained thereon by cotter pins P¹ and which lock members will engage the grooves L¹ of the adjustment collars and hold the latter against movement.

The assembling of the parts constituting my present invention is easily accomplished. The gear wheels B and B¹ are secured rigidly to the ends of the shafts A A¹, the spider is then placed in position with its hub engaging the inner portion of the hubs of the gear wheels, then the half sections are moved together, the free ends of the shafts O upon which the pinions C and D are journaled and which will mesh with the gear wheels B and B¹, being passed through suitable bores provided therefor in the walls of the half sections of the housing. Then with the tightening of the bolts I my improved differential gearing is complete.

I am aware that changes might be made in the details and minor parts of the construction shown in this embodiment of my invention, within the scope of the appended claims, without departing from the nature or spirit of my invention and without sacrificing any of its advantages.

What I claim as my invention and desire to secure by Letters Patent of the United States, is—

1. A housing for differential gearing of the kind described, comprising half sections provided with central journal bearings and having thickened portions in the walls to alternate with each other and wherein to anchor the shafts for the pinions, the meeting faces of said half sections having recesses to register with each other, a spider having its peripheral portion to fit in said recesses, and having a central journal bearing, and which spider has openings through which may be passed the pinions, and means to hold the said spider and the half sections of said housing securely together.

2. A housing for differential gearing of the kind described, comprising a hollow drum shaped centrally divided housing, the meeting faces of the peripheral portions of the half sections being provided with annular offsets or rabbets which will register with each other, and said half sections each being provided with a central journal bearing and having thickened portions in the walls wherein to anchor the shafts for the pinions, a spider of such diameter that its peripheral edges will fit snugly in the space between the meeting offsets in the housing, said spider having transverse recesses in its peripheral face, and being provided with a central journal bearing, and bolts to bind the said half sections securely together and which bolts will engage the said recesses in the peripheral edges of the said spider.

3. In a device of the kind described, a pair of shafts, gear wheels secured on the meeting ends of same and having outwardly extended hubs, a housing composed of half sections having central lateral extensions journaled on the outer portions of the hubs of the gear wheels but having no bearing on the shafts, and the walls of the half sections being provided with thickened portions in alternated positions and forming foundations for the pinion shafts substantially as described, shafts rigidly secured in said thickened portions, a spider in the bore of which is journaled the inner ends of the hubs of the gear wheels, the body portion of which spider has openings through which the pinions may be passed, and means to hold together the spider and the half sections.

4. In a device of the kind described, a pair of shafts, gear wheels secured on the meeting ends of same and having outwardly extended hubs, a housing composed of half sections having central lateral extensions journaled on the outer portions of the hubs of the gear wheels but having no bearing on the shafts, and the walls of the half sections being provided with thickened portions in alternate positions and forming foundations for the pinion shafts, substantially as described, shafts rigidly secured in said thickened portions, a spider in the bore of which is journaled the inner ends of the hubs of the gear wheels, the body portion of which spider has openings through which the pinions may be passed, and bolts to pass transversely through the peripheral portions of the half sections to secure the half sections together and which bolts engage the peripheral portion of the spider.

5. A housing for a differential gearing of the kind described, comprising a hollow drum shaped centrally divided housing, the meeting faces of the peripheral portions of the half sections being provided with annular offsets or rabbets which will register with each other, said half sections each being provided with a central journal bearing and having thickened portions in the walls wherein to anchor the shafts for the pinions, a spider of such diameter that its peripheral edges will fit snugly in the space between the meeting offsets in the housing, bolts to bind the said half sections securely together and which bolts will engage the peripheral edges of said spider, a bearing member carried by and adjustable longitudinally on each of the central journal bearings of the said housing, means carried by the housing to hold the said bearing members in different adjusted positions, and a frame having bearings in which said bearing members will work.

6. In a device of the kind described, the combination of a pair of shafts, gear wheels secured to same at their meeting ends, a housing consisting of separable half sections having the inner surfaces of the walls to engage the outer faces of the gear wheels and the hubs of said half sections being of suitable bore to form journals for the outer portions of the hubs of the gear wheels, and there being thickened portions in the walls of said half sections, to alternate with each other in position and to form foundations in which to anchor the shafts of the pinions, shafts rigidly secured in said thickened portions, pinions to mesh with each other and with the gear wheels journaled on said shafts and having their ends to bear against the sides of the thickened portions and the inner faces of the walls of the half sections, and the meeting peripheral portions of the half sections having offsets therein to form a recess between the faces of the half sections when same are secured together, and a spider having its peripheral edges to fit in said recess and having a hub in which the inner portions of the hubs of the gear wheels are journaled, the ends of which hub will engage the inner face of the gear wheels.

7. In a device of the kind described, the combination of a pair of shafts, gear wheels secured to same at their meeting ends, a housing consisting of separable half-sections having the inner surfaces of the walls to engage the outer faces of the gear wheels and the hubs of said half sections being of suitable bore to form journals for the outer portions of the hubs of the gear wheels, and there being thickened portions in the walls of said half sections to alternate with each other in position and to form foundations in which to anchor the shafts for the pinions, shafts rigidly secured in said thickened portions, pinions to mesh with each other and with the gear wheels that are journaled on said shafts and which have their ends to bear against the sides of the thickened portions and the inner faces of the walls of the half sections, and the meeting peripheral portions of the half sections having offsets therein to form a recess between the faces of the half sections when they are secured together, a spider having its peripheral edges to fit in said recess and having a hub in which the inner portions of the hubs of the gear wheels are journaled the ends of which hub will engage the inner faces of the gear wheels, bearing rings adjustable longitudinally on the outer portions of the hubs of the half-sections of the housing, a frame having bearings for said bearing rings, and dogs carried on the outer ends of the pinion shafts to hold the bearing rings in different adjusted positions.

8. The combination of a housing for differential gearing of the kind described, comprising half sections having hubs to form journal bearings for the outer portions of the hubs of the gear wheels, and being provided with thickened portions alternately arranged to provide foundations for the pinion shafts, the internal edges of the meeting peripheral faces of the half sections being recessed, a spider having a hub in which the inner portions of the gear wheels are journaled and the peripheral edges of which will engage said recess, and means to bind the said half-sections and the peripheral portions of the spider together, substantially as described.

9. In a device of the kind described, a pair of shafts, gear wheels secured on the meeting ends of said shafts and having outwardly extended hubs, a housing composed of half sections having central lateral extensions journaled on the outer portions of the hubs of the gear wheels but having no bearing on the shafts, and the walls of the half sections being provided with thickened portions in alternated positions and forming foundations for the pinion shafts, shafts rigidly secured in said thickened portions, a member in the bore of which is journaled the inner ends of the hubs of the gear wheels and means to hold together the half sections.

10. The combination of a pair of shafts, gear wheels secured to same at their meeting ends, a housing consisting of separable half-sections having the inner surfaces of the walls to engage the outer faces of the gear wheels and the hubs of said half sections being of suitable bore to form journals for the outer portions of the hubs of the gear wheels, and there being thickened portions in the walls of said half sections to alternate with each other in position and to form foundations in which to anchor the shafts for the pinions, shafts rigidly secured in said thickened portions, pinions to mesh with each other and with the gear wheels that are journaled on said shafts and which have their ends to bear against the sides of the thickened portions and the inner faces of the walls of the half sections, and a member having a bore in which the inner portions of the hubs of the gear wheels are journaled, the ends of which member will engage the inner face of the gear wheels.

In testimony whereof I have hereunto signed my name to this specification in the presence of two subscribing witnesses.

HUGH L. WARNER.

Witnesses:
BERTHA SCOTT,
CHAS. E. COREY.

Copies of this patent may be obtained for five cents each, by addressing the "Commissioner of Patents, Washington, D. C."